(12) United States Patent
Macken et al.

(10) Patent No.: US 9,502,064 B1
(45) Date of Patent: Nov. 22, 2016

(54) RECORDING HEAD WITH SURFACE CHARGE CONTROL

(71) Applicant: Seagate Technology LLC, Cupertino, CA (US)

(72) Inventors: Declan Macken, Eden Praire, MN (US); Daniel W. Olson, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/839,590

(22) Filed: Aug. 28, 2015

(51) Int. Cl.
  *G11B 21/02* (2006.01)
  *G11B 27/36* (2006.01)
  *G11B 5/60* (2006.01)

(52) U.S. Cl.
  CPC .................... *G11B 5/6035* (2013.01)

(58) Field of Classification Search
  None
  See application file for complete search history.

(56) References Cited

U.S. PATENT DOCUMENTS

| | | | |
|---|---|---|---|
| 6,359,746 B1 * | 3/2002 | Kakekado | G11B 5/54 360/75 |
| 7,046,473 B2 | 5/2006 | Fu et al. | |
| 7,440,218 B2 * | 10/2008 | Iwamoto | G11B 5/40 360/73.01 |
| 7,440,219 B2 | 10/2008 | Zhu et al. | |
| 7,679,857 B2 | 3/2010 | Zhu et al. | |
| 8,049,984 B2 | 11/2011 | Contreras et al. | |
| 8,085,490 B2 | 12/2011 | Franca-Neto et al. | |
| 8,630,057 B2 | 1/2014 | Murthy et al. | |
| 8,830,618 B2 | 9/2014 | Li et al. | |
| 8,995,076 B1 | 3/2015 | Olson et al. | |

* cited by examiner

*Primary Examiner* — K. Wong
(74) *Attorney, Agent, or Firm* — Hall Estill Attorneys at Law

(57) ABSTRACT

A data recording head may consist of at least a charge control circuit that has a substrate, ground, surface charge circuitry, and data reader circuitry. The substrate may be electrically isolated from the ground and electrically connected between the surface charge circuitry and a non-zero fixed voltage. The surface charge circuitry can be configured to apply a varying substrate charge to the substrate at a predetermined frequency to alter a head media spacing between the substrate and a data storage medium.

20 Claims, 3 Drawing Sheets

RECORDING HEAD WITH SURFACE CHARGE CONTROL

SUMMARY

A data recording head, in accordance with some embodiments, has a charge control circuit consisting of a substrate, ground, surface charge circuitry, and data reader circuitry. The substrate is electrically isolated from the ground and electrically connected between the surface charge circuitry and a non-zero fixed voltage. The surface charge circuitry is configured to apply a substrate charge to the substrate at a predetermined frequency to alter a head media spacing between the substrate and a data storage medium.

DETAILED DESCRIPTION

Demand for increased data storage capacity and faster data access times has emphasized the speed and precision of data access components, such as a transducing head in relation to a data storage medium. While a heater protrusion can be used to manipulate the position of a transducing head, a heater can be slow and imprecise. Hence, assorted embodiments are directed to faster and more precise transducing head manipulation relative to an adjacent data storage medium by utilizing a surface charge circuitry to generate electrostatic charge that can attract the transducing head with respect to the data storage medium.

Application of a surface charge to a slider of a data transducing head can optimize the head-disk interface by mitigating wear and contamination. In addition, application of an oscillating charge at a specific frequency can facilitate high fidelity contact detection when signal is weak, such as with stiff air bearings. However, in a transducing head that features one or more bleeder resistors to connect surface charge circuitry to a preamplifier ground, some of the voltage intended to charge the transducing head is lost to the ground. This occurs as a result of a voltage divider effect and the magnitude is determined by the ratio of the resistance used to charge the slider and the resistance of the bleeder resistor.

Accordingly, a data storage system, in various embodiments, has no deliberate electrical connection at a wafer lever between surface charge circuitry and a preamplifier ground. Such electrical isolation allows the maximum voltage available from the preamplifier to charge the transducing head at the air bearing without loss. In accordance with some embodiments, a charge control circuit has a substrate, ground, surface charge circuitry, and data reader circuitry with the substrate being electrically isolated from the ground and electrically connected between the surface charge circuitry and a non-zero fixed voltage. The surface charge circuitry is configured to apply a substrate charge to the substrate at a predetermined frequency to alter a head media spacing between the substrate and a data storage medium.

Figure 1:
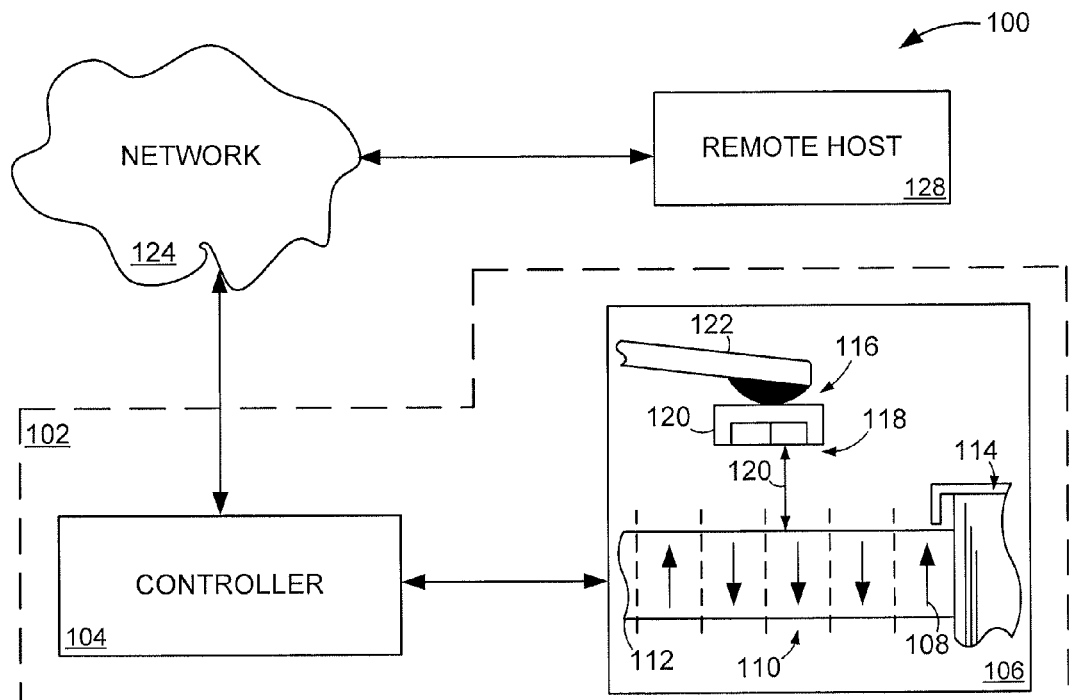
FIG. 1 is a line representation of an example portion of a data storage system configured and operated in accordance with some embodiments.

FIG. 1 generally displays an example data storage system 100 that is arranged in accordance with assorted embodiments to store and retrieve data. Although not required or limiting, the data storage system 100 may have any number of data storage devices 102 that comprise one or more local controllers 104 and a data transducing system 106, such as a part of a cloud computing environment. The portion of a single data transducing system 106 shown in FIG. 1 illustrates how a plurality of magnetic data bits 108 can be perpendicularly stored in and read from data tracks 110 on a data medium 112 that is controlled by a centrally positioned spindle motor 114.

An actuating assembly 116 can be configured to float a predetermined distance 118 above the data bits 108 and data medium 112 on an air bearing 120 so that at least one transducing head 122 is suspended over selected data bits 108 and tracks 110. In this way, the local controller 104 can dictate data access to and from the data medium 112 across the air bearing 120 by spinning the spindle motor 114 and articulating the suspension 124. It should be noted that control of the data transducing system 106 is not limited to the local controller 104 as various remote hosts 126, such as a processor, server, or node, can concurrently and individually utilize the transducing system 106 across one or more wired or wireless networks 128 via appropriate communications protocol.

Figure 2:
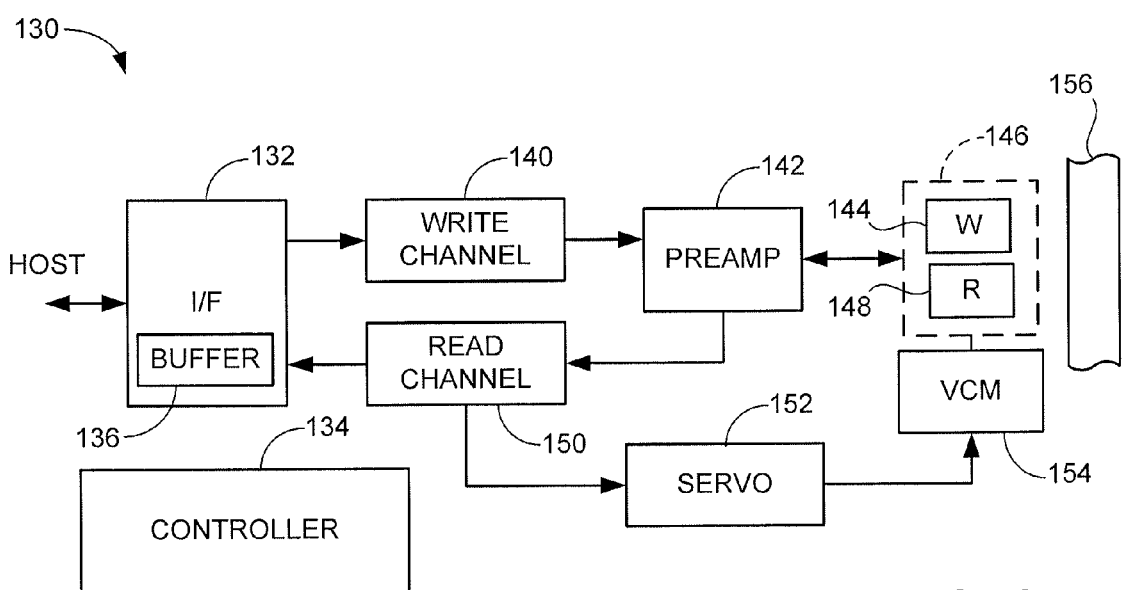
FIG. 2 displays a block representation of a portion of a data storage device capable of being utilized in the data storage system of FIG. 1.

Despite the ability to remotely and locally control the transducing system 106, minimization of the physical size of the transducing system 106 and increases in the areal density of the data bits 108 have stressed the magnetic extent and precision of data access components, like data and writers. FIG. 2 displays a functional block diagram for a data storage device 130 that may correspond to the device 102 of FIG. 1 in accordance with some embodiments. The data storage device 130 is characterized for purposes of the present disclosure as a hard disc drive (HDD) that employs magnetic recording to store data from a host device (not separately shown).

The data storage device 130 has a top level local controller 132 that may be realized in hardware or firmware. An interface circuit (I/F) 134 communicates with the host device and includes a data buffer 136 to temporarily store data pending transfer between the host device and a rotatable perpendicular data recording medium 138. A write channel 140 operates to encode input write data from the host to provide a serialized data stream to a preamplifier/driver (preamp) 142. The preamp 142 provides a sequence of write currents to a perpendicular magnetic write element (W) 144 of a data transducer 146 to write data to the medium 138.

During a readback operation, readback signals are transduced by a magneto-resistive (MR) read element (R) 148 of the data transducer 146. The transduced signals are supplied to the preamp 142. The preamp 142 conditions and amplifies the readback signals and provides the same to a read channel 148. The read channel 148 applies signal processing techniques to recover the originally stored data to the buffer 136 pending subsequent transfer to the host.

During both read and write operations, specially configured servo positioning data provided to the medium 138 are transduced by the read element 148 and, after demodulation by a portion of the read channel 150, are supplied to a servo control circuit 152. The servo control circuit 152 provides positional control signals to a voice coil motor (VCM) 154 coupled to the data transducer 146 to position the respective write 144 and read 148 elements adjacent various data tracks defined on the medium 138.

Although not required or limiting, the preamp 142 may incorporate a charge control circuit that is directed by the controller 132 to manipulate and/or maintain the head media spacing 156 between the data transducer 146 and the medium 138. That is, a charge control circuit may be physically located in the preamp 142 and utilize one or more connections of the preamp 142, such as a ground pad. It is contemplated that the charge control circuit may be on a common chip with some, or all, the preamp 142, but such configuration is not required.

Figure 3:
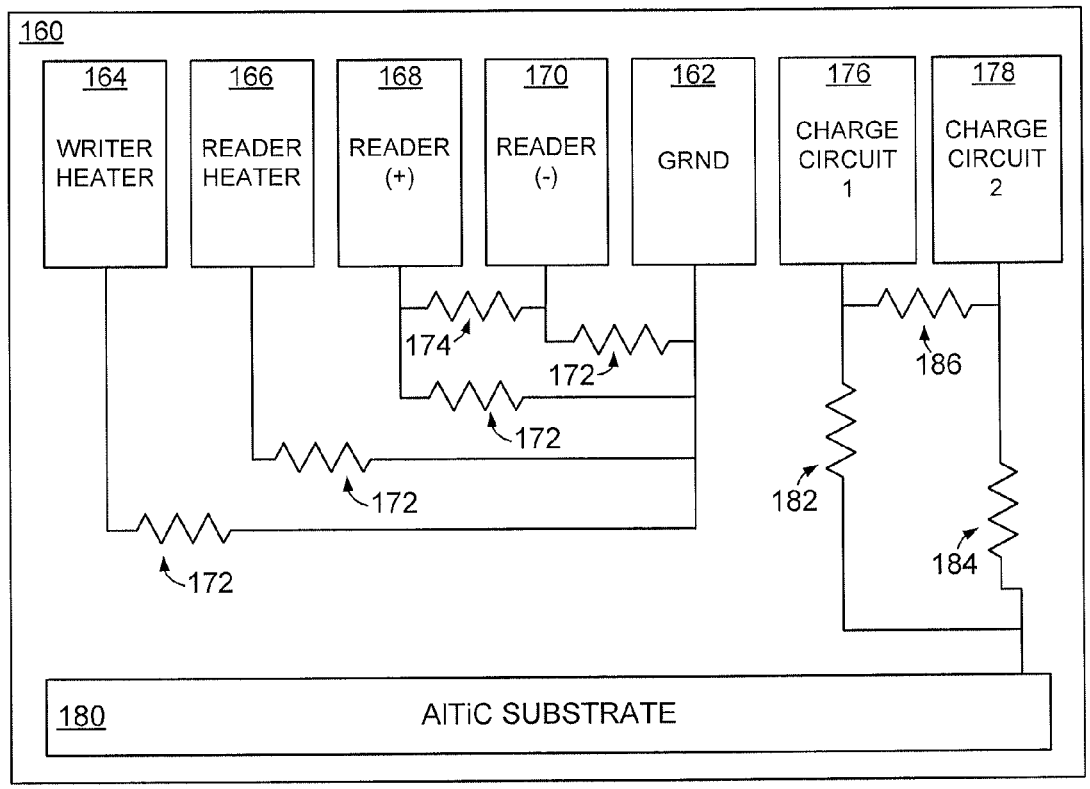
FIG. 3 illustrates a line representation of an example circuit configured in accordance with various embodiments.

FIG. 3 illustrates a block representation of an example charge control circuit 160 constructed and operated in accordance with some embodiments to manipulate a separation distance between a transducing head and a data storage medium. As shown, the charge control circuit 160 has a ground pad 162 (GRND) that is electrically connected to a data writer heater 164, a data reader heater 166, first reader circuit 168, and second reader circuit 170 with one or more resistors 172. The resistors 172 can be configured to be similar, or dissimilar, resistance values (Ohms) that allow operation of the respective heater and data reading components. For the reader circuits 168 and 170, a connecting resistor 174 interconnects the respective reader control lines.

The charge control circuit 160 also has first 176 and second 178 surface charge control modules that can individually and collectively generate static and oscillating surface charge at one of a plurality of different frequencies. Each surface charge control module 176 and 178 is electrically connected to a substrate 180 via first 182 and second 184 resistors and conductive traces, which may have matching or different resistance values. A balancing resistor 186 interconnects the first and second surface control module traces and can be tuned to optimize delivery of voltage from the charge circuit control modules 176 and 178 to the substrate 180.

It is noted that the substrate 180 is not limited to a particular material, but is constructed of AlTiC in some embodiments. The substrate 180 is positioned, in some embodiments, on or proximal an air bearing surface of a transducing head so that charge generated by the charge control modules 176 and 178 can interact with charge at the surface of an adjacent data storage medium.

When the substrate 180 is electrically connected between a non-zero voltage source, such as the first control module 176, and a ground, such as the ground pad 162, voltage can be lost and the surface charge on the substrate 180 is not strong enough to manipulate the position of the transducing head fast enough or precisely enough to provide optimized data storage performance. Hence, assorted embodiments electrically connect the substrate 180 between two non-zero voltage sources, such as the first 176 and second 178 control modules. That is, the first control module 176 can operate in concert with the second control module 178 to set the surface charge of the substrate 180 at a predetermined intensity and frequency, which would not be possible if the substrate 180 was electrically connected to the ground pad 162.

Figure 4:
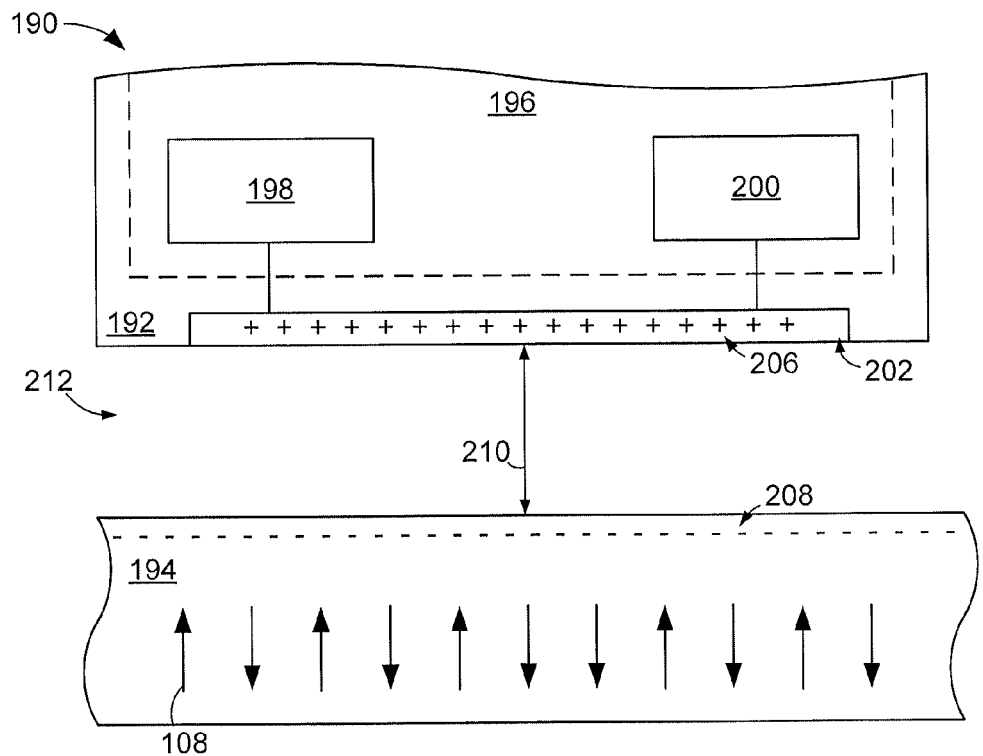
FIG. 4 shows a line representation of portions of an example data storage device constructed and operated in accordance with some embodiments.

FIG. 4 illustrates a line representation of a portion of an example data storage device 190 configured in accordance with various embodiments to employ surface charge to manipulate the size of an air bearing. The data storage device 190 has a transducing head 192 proximal to and separated from a data storage medium 194. The transducing head 192 may have a data reader and data writer incorporated therein while the data storage medium has a plurality of data bits 108 stored with a predetermined recording scheme, such as perpendicular, longitudinal, and bit-patterned data storage.

A surface charge control circuit 196 may be resident on, or interconnected to, the transducing head 192 with first 198 and second 200 voltage sources electrically connected to one or more substrates 202 positioned on an air bearing surface 204. In various embodiments, each substrate 202 is electrically isolated from a ground and is instead held at a fixed, or oscillating, charge by configuring the voltage sources 198 and 200 to be different, non-zero values. In other words, a substrate charge 206, as shown by plus signs that are not restrictive to a positive polarity charge, is generated in the substrate 202 by configuring the voltage sources 198 and 200 to be different and non-zero values.

The charge resident in the substrate 202 can be altered in strength and polarity by adjusting the non-zero voltages of the respective voltage sources 198 and 200. A surface charge 208 in the data storage medium 194, which is shown as negative signs that is not restrictive to a negative polarity charge, can electrostatically interact with the substrate charge 206 to attract, or reduce attractive force from, the transducing head 192 to the data storage medium 194. The medium surface charge 208 may be static or dynamic, which can be compensated for by altering the substrate charge 206 via the respective voltage sources 198 and 200.

Through the manipulation of the substrate charge 206 relative to the medium charge 208 the size 210 of the air bearing 212 between the head 192 and medium 194 can be increased, or decreased, quickly and accurately. In contrast, a piezoelectric actuator or heat controlled protrusion can be slow, power hungry, and too imprecise to accurately control the head media spacing 210 and optimize data storage and retrieval by the transducing head 192. For example, configuring the transducing head 192 for heat assisted magnetic recording (HAMR) can rely heavily on the head media spacing 210 for accurate operation as small differences in modeled and actual head media spacing 210 can result in too little, or too much heat being applied to the data storage medium.

It is contemplated that inclusion of a bleeder resistor between the substrate 202 and a ground in the control circuit 196 can degrade the strength of the substrate charge 206. Conversely, by electrically positioning the substrate 202 between the non-zero voltage sources 198 and 200, substrate charge 206 strength can be maximized and experience substantially loss-less transmission from the first voltage source 198, which may be a first driver and/or preamplifier that serves as the first control module, to the second voltage source 200, which may be a second driver and/or preamplifier that serves as the second control module.

Figure 5:
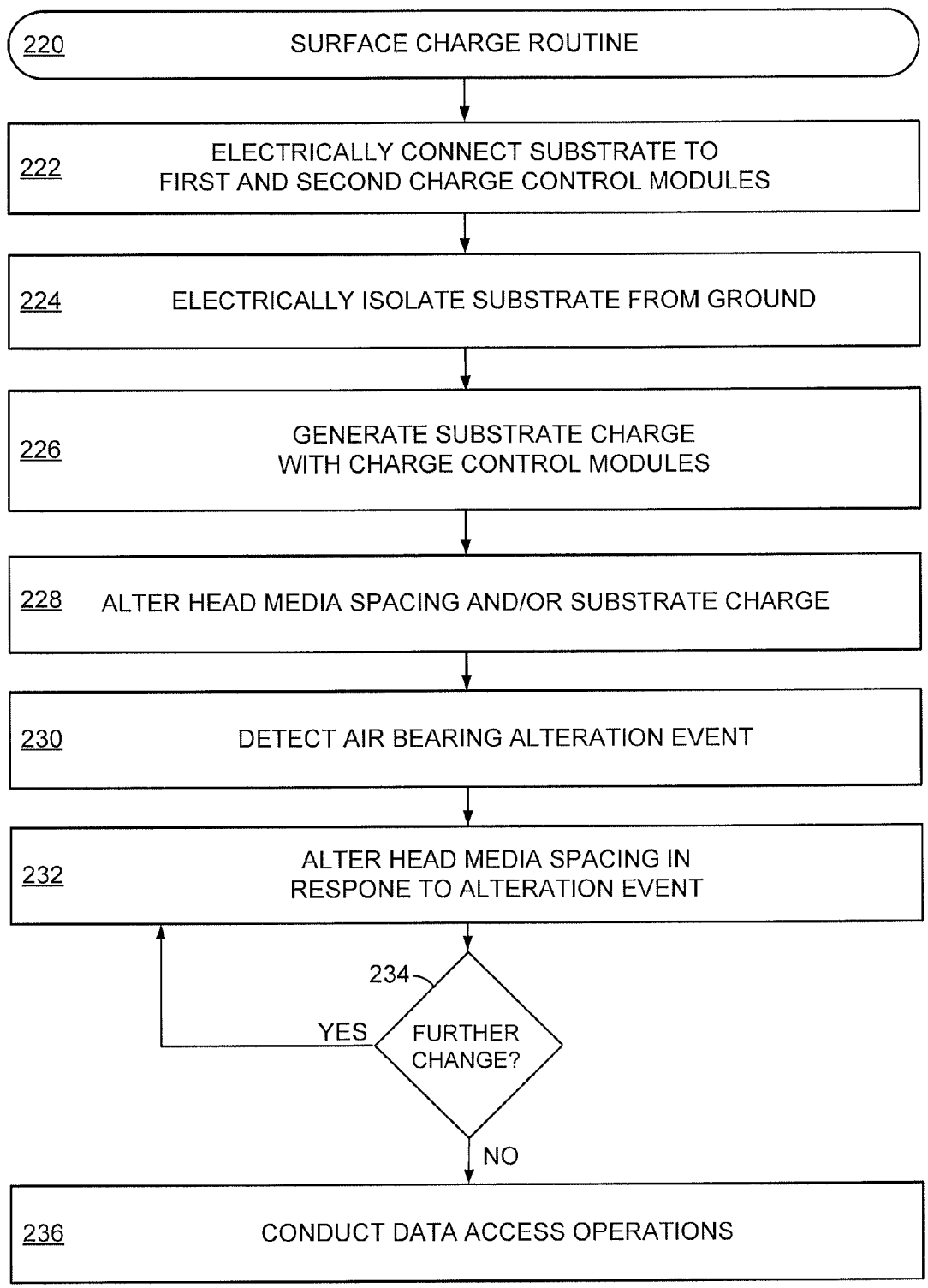
FIG. 5 provides an example surface charge routine that is carried out in accordance with assorted embodiments by the data storage system of FIG. 1.

FIG. 5 is a flowchart of an example surface charge routine 220 that is carried out in some embodiments by the surface charge control circuit 160 of FIG. 3. Initially, a transducing head electrically connects a substrate to first and second charge control modules of a surface charge control circuit in step 222. The substrate can be electrically isolated from any zero voltage ground connection in step 224, which may be conducted during or prior to step 222.

The routine 220 next employs multiple non-zero voltages provided by the control modules to produce a static or oscillating charge in the substrate of the transducing head in step 226. The substrate charge can be generated at a predetermined frequency, which may vary with respect to time and/or the rotation of the adjacent data storage medium. For instance, the surface charge control circuit can detect a data medium rotational speed (RPM) by sensing the servo sampling frequency from the data storage medium and subsequently set the substrate charge to the detected servo sampling frequency.

The ability to adjust the substrate charge frequency to the rotation of the corresponding data storage medium allows the charge generated in step 226 to be more compatible with the surface charge of the medium to alter the head media spacing in step 228. It is noted that step 228 may alter the substrate charge to adapt to the surface charge of the data storage medium and maintain a head media spacing instead of changing the distance between the transducing head and medium.

With the substrate charge electrostatically interacting with the surface charge of the data storage medium, step 230 detects an air bearing alteration event, such as a thermal asperity, head-disk contact, or data writing operation, and proceeds to alter the substrate charge in step 232 to change the size of the air bearing. The head media spacing after step 232 can be evaluated in decision 234 to determine if further substrate charge changes are to be made by returning to step 232 or if data access operations can be conducted in step 236 due to the head media spacing being confirmed.

Through the electrical isolation of a substrate from ground and electrical connection between two non-zero voltage sources, substrate charge can be efficiently generated and altered to manipulate and maintain the size of an air bearing. The ability to accommodate and electrostatically interact with surface charge of a data storage medium, the air bearing can be quickly and accurately changed for any reason. The position of the substrate between two non-zero voltage sources allows maximum preamplifier voltage generate the substrate charge, which optimizes the efficiency of altering the size of an air bearing.

It is noted that the various embodiments are not limited to a data storage devices as the technology can readily be utilized in any number of other applications, such as switches and other electrical closure applications. It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed.

What is claimed is:

1. An apparatus comprising a charge control circuit resident in a preamplifier of a transducing head and comprising a substrate, ground, surface charge circuitry, and data reader circuitry, the substrate positioned proximal an air bearing surface (ABS), electrically isolated from the ground, and electrically connected between the surface charge circuitry and a non-zero fixed voltage, the surface charge circuitry configured to apply a varying substrate charge to the substrate at a predetermined frequency to alter a head media spacing between the substrate and a data storage medium.

2. The apparatus of claim 1, wherein the predetermined frequency is dependent on a rotational speed of the data storage medium.

3. The apparatus of claim 1, wherein the substrate comprises AlTiC.

4. The apparatus of claim 1, wherein the surface control circuitry comprises first and second control lines extending from the substrate to respective first and second control modules.

5. The apparatus of claim 4, wherein the first control line has a first resistor and the second control line has a second resistor, the first and second resistors connected in parallel to the substrate.

6. The apparatus of claim 4, wherein the first and second resistors are different resistance values.

7. The apparatus of claim 4, wherein the first and second resistors are each a common resistance value.

8. The apparatus of claim 4, wherein a third resistor connects the first and second control lines, the third resistor being a different resistance value than the first and second resistors.

9. The apparatus of claim 1, wherein the charge control circuit is positioned wholly on a single wafer.

10. An apparatus comprising a charge control circuit resident in a transducing head and comprising a substrate, ground, surface charge circuitry, and data reader circuitry, the data reader circuitry electrically connected to the ground, the substrate positioned proximal an air bearing surface (ABS), electrically isolated from the ground, and electrically connected between the first and second charge control modules of the surface charge circuitry, the first and second charge control modules each having a non-zero fixed voltage, the surface charge circuitry configured to apply a varying substrate charge to the substrate at a predetermined frequency to alter a head media spacing between the substrate and a data storage medium.

11. The apparatus of claim 10, wherein the data storage medium has a surface charge, the surface charge attracted to the substrate charge.

12. The apparatus of claim 10, wherein the substrate charge is supplied by a preamplifier via the surface charge circuitry.

13. The apparatus of claim 10, wherein the predetermined frequency is static or oscillating.

14. The apparatus of claim 10, wherein the non-zero fixed voltage is provided by the surface charge circuitry.

15. A method comprising:
positioning a charge control circuit on a wafer in a transducing head, the charge control circuit comprising a substrate, ground, surface charge circuitry, and data reader circuitry, the substrate positioned proximal an air bearing surface (ABS);
isolating the substrate electrically from the ground;
connecting the substrate electrically to first and second charge control modules of the surface charge circuitry the first and second charge control modules each having a non-zero fixed voltage; and
applying a varying substrate charge to the substrate with the surface charge circuitry, the varying substrate charge having a predetermined frequency to alter a head media spacing between the substrate and a data storage medium.

16. The method of claim 15, wherein the substrate charge alters the head media spacing by being attracted to a surface charge of the data storage medium.

17. The method of claim 15, wherein the substrate charge detects contact between the substrate and the data storage medium.

18. The method of claim 15, wherein the substrate charge is altered from the first frequency to a second frequency to alter the head media spacing.

19. The method of claim 18, wherein the first frequency is smaller than the second frequency.

20. The method of claim 15, wherein a maximum voltage available from the surface charge circuitry is passed to the substrate without loss.

* * * * *